United States Patent
Evans et al.

(12) 
(10) Patent No.: US 6,307,880 B1
(45) Date of Patent: Oct. 23, 2001

(54) METHOD AND SYSTEM FOR EXTERNALLY INCORPORATING AUTOMATIC SWITCHING BETWEEN VOICE AND DATA COMMUNICATIONS

(75) Inventors: John P. Evans, Riverton; Shayne Messerly, Farmington, both of UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 08/957,711

(22) Filed: Oct. 24, 1997

(51) Int. Cl.[7] .............................. H04B 1/44; H04M 11/00
(52) U.S. Cl. ................ 375/222; 375/257; 379/93.06; 379/93.09
(58) Field of Search .................................. 375/222, 257; 379/93.09, 93.01, 96, 97, 98, 99, 100; 370/468

(56) References Cited

U.S. PATENT DOCUMENTS

| | | | |
|---|---|---|---|
| 5,493,609 | 2/1996 | Winseck, Jr. et al. | 379/96 |
| 5,583,922 | 12/1996 | Davis et al. | 379/96 |
| 5,592,538 | 1/1997 | Kosowsky et al. | 379/93 |
| 5,602,902 | 2/1997 | Satterlund et al. | 379/59 |
| 5,604,711 | 2/1997 | Quiros | 375/326 |
| 5,625,678 | * 4/1997 | Blomfield-Brown | 379/93 |
| 5,768,351 | * 6/1998 | England | 379/93.37 |

* cited by examiner

*Primary Examiner*—William Lather
(74) *Attorney, Agent, or Firm*—Workman, Nydegger & Seeley

(57) ABSTRACT

A method and apparatus for automatically switching between voice and data communications as directed by a voice and data capable modem via a cable assembly incorporating a switching means for facilitating and inhibiting the routing of voice information to a voice telephone. A voice and data capable modem incorporates the software functionality associated with a voice and data capable protocol with minimal impact to the form factor associated with the modem, To reduce the impact to the form factor associated with integrated modem designs, the switching hardware associated with voice and data capability is incorporated into a cable assembly used to interconnect the voice and data capable modem with the voice telephone. Additional means for identifying the cable assembly as having the requisite switching functionality is also provided.

17 Claims, 6 Drawing Sheets

METHOD AND SYSTEM FOR EXTERNALLY INCORPORATING AUTOMATIC SWITCHING BETWEEN VOICE AND DATA COMMUNICATIONS

BACKGROUND OF THE INVENTION

1. The Field of the Invention

This invention relates generally to telecommunication equipment for exchanging voice and data information. More particularly, the invention relates to the hardware equipment requirements for facilitating the switching between voice and data modes during a communication session.

2. Present State of the Art

Telephone communications systems traditionally facilitate the exchange of voice information between telephone users. As the telephone network or infrastructure expanded to provide a well developed and wired network for telephonic communicators, other technologies were also emerging. For example, digital devices such as computers, and more particularly personal computers, proliferated in their own digital domain. Furthermore, collocated computers, or computers located physically nearby other computers, were interconnected using traditional networking techniques such as local area networks. Physically interconnecting remote computers by employing dedicated interconnections often proved impractical or infeasible as interconnection alternatives.

Traditional telephonic networks employed switching mechanisms conducive for transmission of analog signals such as voice. Direct transmission of digital signals having fast rise and fall times were not conducive to the analog propagation characteristics of telephonic networks. To overcome such limitations, devices were developed to transform digital data, characteristic of computer data, into analog formats capable of propagation across traditional telephonic networks. Such transformation equipment became known as modems (modulator/demodulator) which generated analog signals compatible with the telephonic network. As the telephonic network was well developed as a product of the flourishing interconnection of telephone devices, the telephonic network became a compatible interconnection mechanism for interconnecting remote digital data equipment such as personal computers.

In a typical telephonic infrastructure, a specific user location, such as a telephonic location, is interconnected with other members of the telephonic network via a single interconnection path. While additional interconnection paths may be brought to a specific user location, additional communication interconnections result in additional and generally unnecessary expenses to a user. Interconnection sharing techniques emerged in order to accommodate a shared use of a single network interconnection by an analog device, such as a telephone, and a data device, such as a personal computer.

FIG. 1 illustrates a typical shared interconnection topology for accommodating both telephonic interconnections and data interconnections via a single interconnected network path. In FIG. 1, a telephone network 14, illustrated as the public switched telephone network (PSTN), provides the interconnection matrix for routing between local and remote users. Telephone network 14 provides interconnection paths, such as telephone lines 28 and 30, through which local and remote parties are interfaced or interconnected. Since telephone lines 28 and 30 provide only a single interconnection path, a local host 10, such as a personal computer, and a telephone 20 may be alternatively switched and thereby interconnected with telephone line 28. A remote host 18, such as a personal computer, and telephone 24 must also be multiplexed or alternatively switched to utilize the unitary telephone line 30. To facilitate mixed communication of both voice and data information, switches or multiplexing devices have been employed. However, facilitating both voice and data communication during a single communication session requires additional complexity and functionality.

One such implementation for accommodating both voice and data transmissions during a single communication session is the Voiceview industry standard. The Voiceview protocol was developed and published by the Radish Company, and is the most widely used protocol for switching between voice and data modes during a single communications session. The Voiceview mode provides for voice and data communications over a conventional telephone line and facilitates dynamic switching between voice and data modes during a single conversation session. Commercially available modems have incorporated the Voiceview technology and are readily available. FIG. 1 illustrates a Voiceview modem 12 having a voice connection for voice line 22 and a date line connected to the local host 10. Traditional Voiceview modems provide for a single interface to the telephone network such as that illustrated by telephone 28.

In FIG. 1, a local user initiates a communication session by dialing a remote user using telephone 20. Voiceview modem 12 and Voiceview modem 16 default to a voice communication session interconnection for routing voice communication between telephone 20 and telephone 24. When a local user resolves to transmit data to the remote user, the local user prompts local host 10 to inform Voiceview modem 12 to initiate Voiceview commands to Voiceview modem 16 which designates a request to switch the communication path from a voice communication path to a data communication path. A sampling of Voiceview commands includes initialization of Voiceview parameters, a designation of facsimile or Voiceview data protocols to be employed during data transition, acknowledgements such as error status, flow control selections, and reset capabilities. A full listing of Voiceview commands and Voiceview operational specifics are available from modem chip set manufacturers that have incorporated the Voiceview technology into their commercially available chip sets. Such chip set vendors include, among others, Rockwell Semiconductor System. Additional Voiceview information is also available from Radish Communication Systems, Inc. and yet other modem and chip set manufacturers easily ascertainable by those of skill in the art.

In addition to the software functionality incorporated into the Voiceview-capable modems and modem chip sets, hardware capable of physically switching and thereby routing the communications from telephone line 28 to the appropriate voice or data terminal has also been required by Voiceview modems. FIG. 2 represents a prior art configuration of traditional Voiceview modems. A host 40 such as a personal computer, provides a data and control environment for interfacing with a Voiceview modem 42. Voiceview modem 42 incorporates traditional modem hardware 44 such as a bus interface device (generally implemented as an application specific integrated circuit (ASIC)). Traditional Voiceview modem 42 has been further comprised of a telephone line modem jack 56 for interfacing directly with telephone line 46 of telephone network 14. Voiceview hardware 48, responsive to the Voiceview functionality incorporated within the software of traditional modem hardware 44 such as a modem chip set, facilitates the switching between voice and data communications during a single communications session. A telephone connector 54 facilitates the routing of voice communication via a voice line 50 to telephone 52.

While external or larger dimensioned modems have more easily accommodated the inclusion of Voiceview hardware 48, the inclusion of such additional hardware on a smaller integrated form factor modem, such as a PCMCIA modem, becomes intolerable and excessively expensive for purchasers of Voiceview capable modems. While inclusion of Voiceview functionality into a modem chip set requires that additional memory resources be allocated to such functionality, the major deterring factor for incorporation of Voiceview functionality remains the inclusion of additional hardware switching elements into the physically constrained form factor of modern miniaturized modems.

Thus, what is needed is a method and system for providing switching between voice and data communications as directed by modem hardware without incurring the additional burdens associated with incorporating additional hardware devices onto an already restrained modem form factor. Furthermore, what is desired is a method and system for providing automatic switching between voice and data communications as directed by a voice and data capable modem by requiring only minimal alteration to existing modems such as the inclusion of additional firmware within the modem chip set.

SUMMARY AND OBJECTS OF THE INVENTION

It is an object of the present invention to provide an apparatus and method for automatically switching, in a cable assembly, between voice and data communications as directed by a voice and data capable modem as requested by a user.

Another object of the present invention is to provide a method for routing or impeding the routing in a cable assembly of voice and data communications between a voice and data capable modem and a voice telephone when requested by a user.

A still further object of the present invention is to provide a printed circuit board having the requisite switching means within the cable assembly for interconnecting a telephone and a computer thereby routing voice and data communications therebetween.

Yet another object of the present invention is to provide a method and system for identifying a cable assembly, from among other types of cable assemblies, as a cable assembly capable of automatically switching between voice and data communications as directed by a voice and data capable modem as directed by a user.

A still further object of the present invention is to provide a method and system for interfacing a cable assembly capable of automatically switching between voice and data communications with a cellular telephone interface located on the voice and data capable modem.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. To achieve the objects, and in accordance with the invention as embodied and broadly described herein, a method and system for automatically switching in a cable assembly between voice and data communications as directed by a voice and data capable modem is provided.

A telecommunication system includes a telephone network, such as the Public Switched Telephone Network (PSTN), for providing a routing architecture facilitating connectivity between local and remote parties through which information may be exchanged. The telephone network receives digital data in a transformed or modulated state in order to accommodate propagation through the telephone network. A modem associated with a data generator, such as a personal computer, interfaces with a modem for modulating or converting digital data into a propagation-conducive analog format required by many telephone networks.

In the present invention, a modem takes the form of a voice and data capable modem providing functionality necessary for switching between voice and data modes. While many modems take the form of a separate and often external module, modern implementations are often integrated into small modules for enclosure within portable or notebook computers. One common integrated form factor standard is the PCMCIA standard used in most notebook computers. Such highly integrated standards typically may not accommodate increasing complexity and functionality within the confined form factor.

The voice and data capable modem also includes a bus interface for interfacing with the host personal computer, a processor for controlling execution and sequencing, DSP for providing the modulation and demodulation as well as other signal processing features, CODEC for converting between analog and digital formats, and a DAA for providing an isolation boundary between the main modem functionality and the telephone network. The voice and data capable modem may be implemented either as discrete custom circuits or from a commercially available chip set.

The processor further includes functionality, either custom or industry standard such as the Voiceview protocol, for initiating and detecting a request to switch between voice and data modes. In one preferred embodiment, Voiceview functionality comprises software processes or routines for evaluating communication information and determining when such protocol requests are present or may independently initiate a switch request between voice and data transmissions. When a switch between modes is requested or detected, a control signal from the processor is initiated to trigger the switching mechanism into a toggled state. Verification of the toggled condition is performed by a switch status signal as verified by the processor.

The present invention overcomes the prior art limitations by not incorporating the physical or hardware switching mechanisms onto the actual modem circuit board or device thereby increasing the form factor or footprint of the modem device. The present invention incorporates the switching mechanism into a cable assembly separate and distinct from the voice and data capable modem. Such a cable assembly interfaces to the voice and data capable modem via an interface port which may be shared or already present from other functionality, such as wireless capability, on the voice and data capable modem. As several types of devices, such as a wireless transceiver, may be interfaced to a modem through the telephone interface, one preferred embodiment of the present invention further provides a cable identification means accessible by the modem for determining the precise nature of the peripheral or device interfaced via the telephone interface means.

As briefly introduced above, the switching hardware associated with providing both voice and data capability is incorporated within a cable assembly. The switching hardware provides for the requisite switching and routing of voice and data information for interconnecting a voice telephone and a computer with a telephone network thereby facilitating both voice and data communication over a single interconnection path during yet a single communication session. The cable assembly provides both a conduit through which information such as voice information may be passed to the voice telephone and provides a physical location in which to place the voice and data capable hardware for both facilitating the exchange of voice communications and impeding the exchange of data communications with the telephone.

The cable assembly of the present invention further includes a telephone connector, such as an RJ-11 plug, for interfacing directly with a telephone jack of the voice telephone. The cable assembly may additionally include a telephone cord to allow the distant placement of the voice telephone from the voice and data capable modem. The cable assembly may further include a connector housing for providing a physical enclosure for the voice and data switching and identification hardware. The cable assembly further includes a modem connector for compatibly interfacing with the telephone interface of the voice and data capable modem.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention embodies within its scope both methods and systems for automatically switching between voice communications and data communications during a single communication session when requested by a user. The purpose of the invention is to allow a user to interconnect both a data generating and receiving device such as a personal computer and an analog device such as a telephone to a single telephone line without requiring or integrating the requisite switching hardware onto the modem associated with the data equipment. As used within this application, "modem" refers to any modulation/demodulation configuration including a discrete modem having digital signal processing performed thereon and other modem configurations performing host signal processing within the host system such as a personal computer. Also as used within this application, the term "telephone network" includes within its scope the public switched telephone network incorporating both analog multiplexing techniques and other interconnection derivations including digital and other networks such as the Internet. Furthermore, the term "host" implies within it's scope both personal and other forms of computer including portable and mobile implementations as well as embedded controller implementations.

Figure 1:
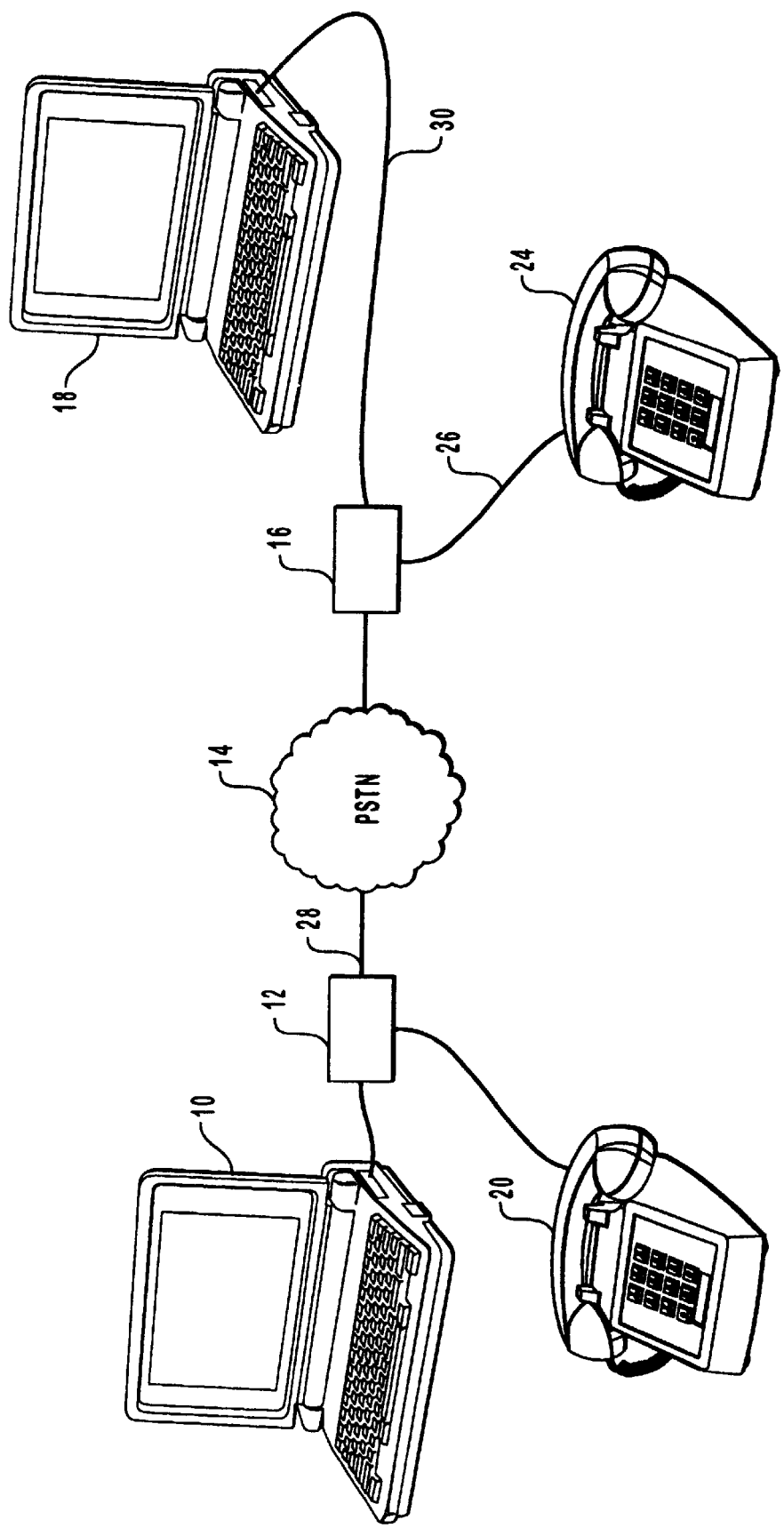
FIG. 1 is a simplified block diagram of traditional interconnections for both voice and data equipments sharing a single interconnection to the telephone network.
Figure 2:
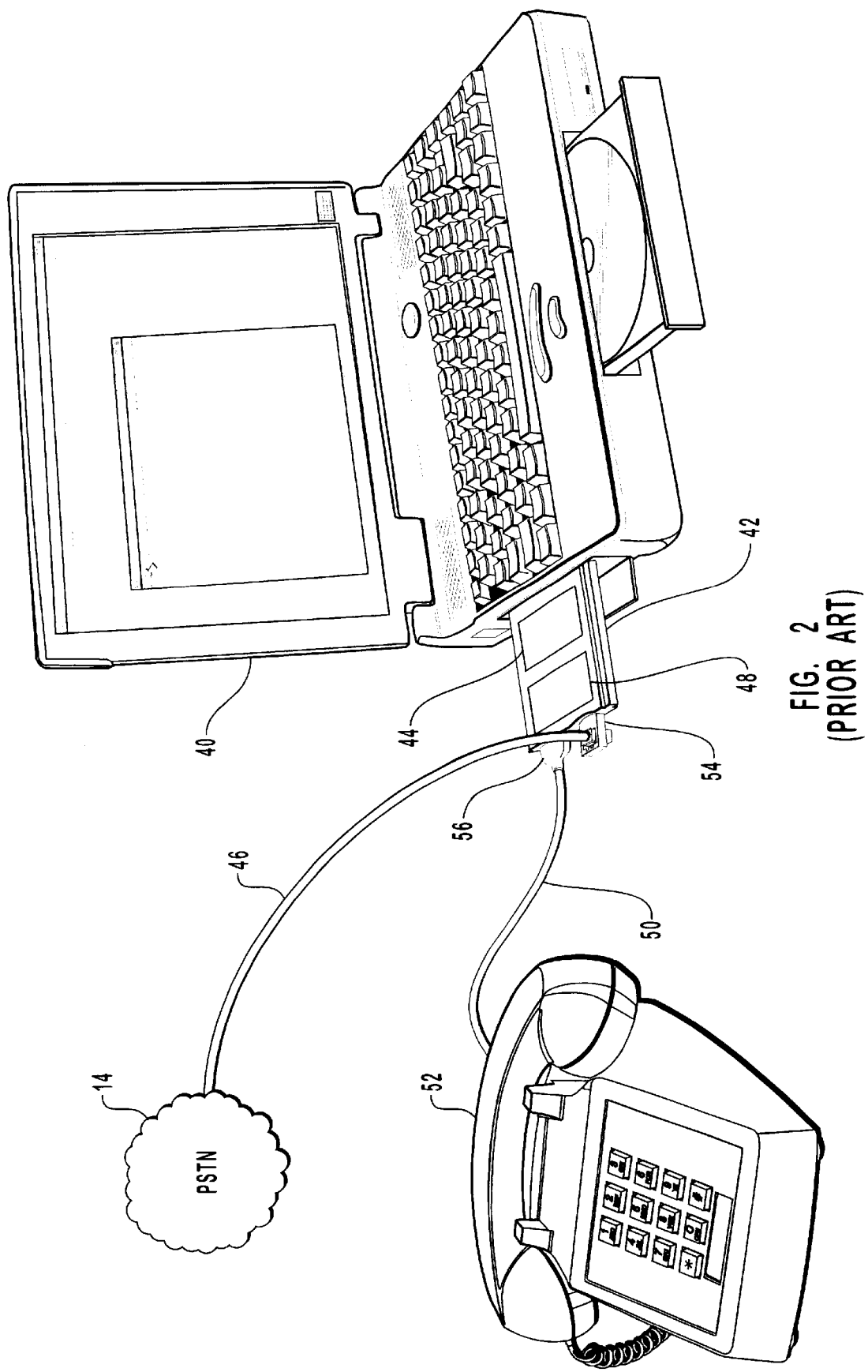
FIG. 2 is a simplified block diagram of a prior art implementation of a voice and data capable modem.
Figure 3:
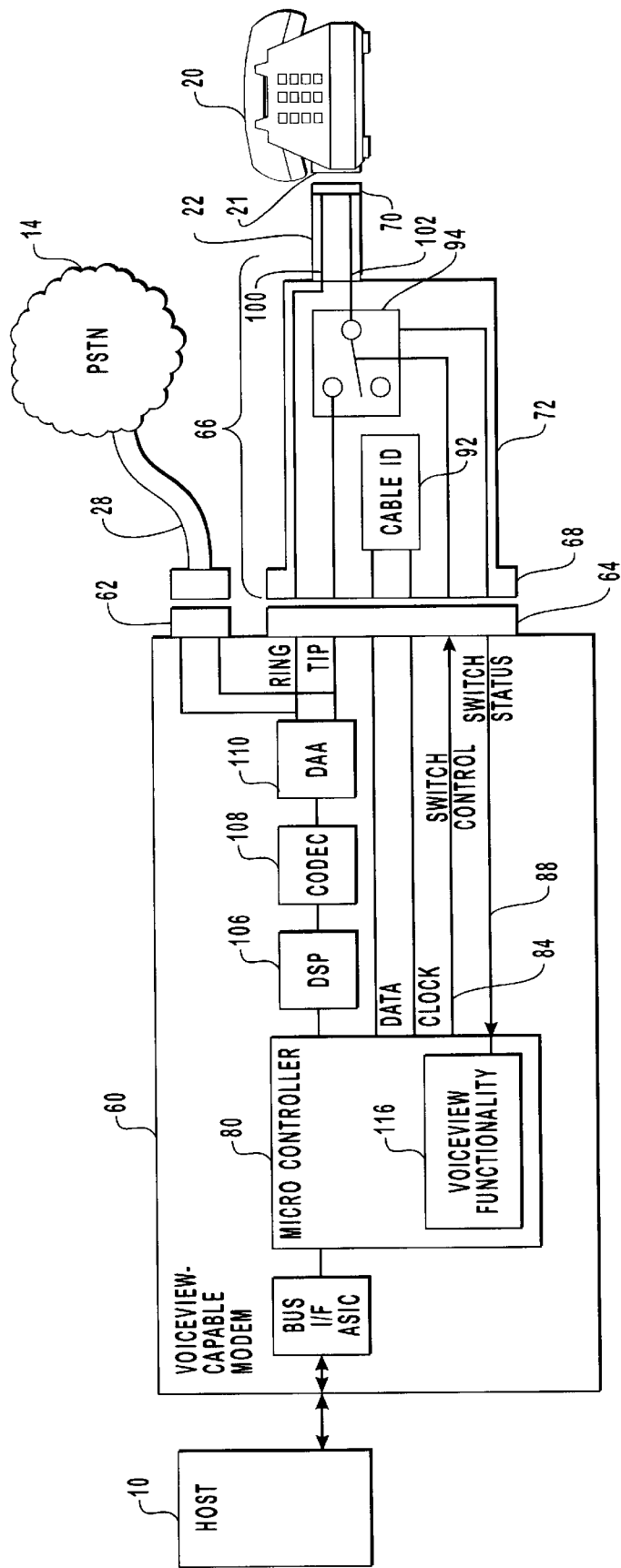
FIG. 3 is a block diagram of an apparatus for interfacing a voice and data capable modem with a telephone, in accordance with a preferred embodiment of the present invention.

Referring to FIG. 3, an overall block diagram of the telecommunication system is depicted, in accordance with a preferred embodiment of the present invention. A telecommunication system includes a telephone network means for providing a routing architecture whereby local and remote parties may be physically interconnected and thereby facilitate a conduit through which information may be exchanged. By way of example and not limitation, in FIG. 3, the telephone network means is depicted as a telephone network 14. In one preferred embodiment, telephone network 14 comprises the public switched telephone network (PSTN) as widely appreciated by those of skill in the art. A telephone line 28 provides a user interconnection point through which a user interfaces with telephone network 14. It should be pointed out that while the preferred embodiment illustrated in FIG. 3 represents a physical connection between telephone network 14 via telephone line 28, wireless connections such as those typical of cellular communications are also considered to be within the scope of the present invention.

As discussed above and as appreciated by those skilled in the art, a communication network, such as telephone network 14, receives digital data in a transformed or modulated state. By modulating the digital data generated by a digital source into an analog signal, the propagation characteristics of network 14 may be maximized. That is to say, the transmission bandwidth associated with telephone network 14 is generally not conducive to the high frequencies associated with the rise and fall times of digital data. Therefore, to accommodate propagation through telephone network 14, the telecommunication system further includes a modem means. The modem means, as described above, provides a means for modulating or converting digital data into a propagation-conducive analog format required by many telephone networks.

By way of example, and not limitation, in FIG. 3, the modem means is depicted as voice and data capable modem 60. As modem means traditionally take the form of a peripheral such as an I/O board or module, a host means provides an environment, generally of the form of a computer and operating system, through which voice and data capable modem 60 interfaces with a user. By way of example, and not limitation, in FIG. 3 the host means is depicted as host system 10. In one preferred embodiment, host system 10 comprises a personal computer including a portable implementation such as portable or notebook personal computer.

The modem means further includes a telephone line interface means providing the physical interface through which both voice and data communication is exchanged with telephone network 14. By way of example and not limitation, the telephone line interface means is depicted as telephone line modem jack 62. In one preferred embodiment, telephone line modem jack 62 comprises an RJ-11 jack through which tip 120 and ring 118 signals are exchanged with telephone network 14.

Voice and data capable modem 60 also includes a processor means for performing, among other things, data handling, modulation and demodulation techniques and line isolation of user equipment with telephone network 14. By way of example, and not limitation, in FIG. 3 the processor means is comprised of a bus interface apparatus 104, microcontroller 80, digital signal processor (DSP) 106, CODEC 108 and direct access arrangement (DAA) 110.

In one preferred embodiment, the processor means is implemented as a commercially available chip set such as those available from Rockwell, AT&T, Cirrus, Sierra, Motorola, Intel, Zylog, and other manufacturers. Such chip sets are often depicted as single or multi-chip modem chip sets. Such chip sets typically comprise a microcontrol unit and digital signal processor portions. While the preferred embodiment of the present invention as depicted in FIG. 3 illustrates controller and signal processing functions separate from host 10, another preferred embodiment, not shown, incorporates controller means 80 and DSP means 106 within host 10 thereby providing a host signal processing or native processing modem means.

Referring to FIG. 3, those skilled in the art will appreciate that bus interface apparatus 104 provides a handshaking and data transfer means through which information is exchanged between host 10 and voice and data capable modem 60. Such implementations of bus interface apparatus 104 traditionally take the form of an application specific integrated circuit (ASIC). Those skilled in the art also appreciate the functionality associated with DSP 106 wherein data signals are modulated and demodulated in digital format for conversion between analog and digital format by CODEC 108. Furthermore, those skilled in the art of modem technology also appreciate the functionality of DAA 110 in providing an isolation boundary between the user equipment, such as voice and data capable modem 60, and telephone network 14. Such an isolation boundary provides both safety and protection for telephone network 14.

The processor means further includes functionality for initiating and detecting a request to switch between voice and data modes. Such functionality may take the form of a proprietary or custom protocol developed for specific applications or, as in the preferred embodiment of the present invention, the functionality may take the form of an industry accepted standard such as the Voiceview protocol. Referring to FIG. 3, the processor means further includes a voice and data switching protocol means which, by way of example and not limitation, in FIG. 3 is depicted as Voiceview functionality 116.

In one preferred embodiment, Voiceview functionality 116 comprises software processes or routines for evaluating communication information and determining when such protocol requests are present. As described above, Voiceview functionality 116 may further initiate a switch request between voice and data transmissions. Those skilled in the art will recognize that such requests may take the form of tones or other commands recognizable by a remote receiving user. Table 1 contains a representative Voiceview command list.

TABLE 1

| Service Class | Originate Voiceview data mode |
|---|---|
| | Accept data mode request |
| | Initialize Voiceview parameters reset capabilities |
| | Data to default setting |
| | Initiate capabilities query |
| | Originate modem data mode |
| | Originate fax data mode |
| | Mute telephone |
| | Disable switchhook status monitoring |
| | Capabilities query response control |
| | Capabilities Data |
| | Error status |
| | Voiceview transmission speed |
| | Start sequence response control |
| | Flow control select |
| | Serial port rate control |
| | Voiceview data mode start sequence event |
| | Facsimile data mode start sequence event |
| | Modem data mode start sequence event |
| | Receive ADSI response event |
| | Receive capabilities query event |
| | Receive capabilities information event |
| | Talk-off event |

When the voice and data switching protocol means initiates a toggle or switch between voice and data modes, a switch control signal 84 is initiated to trigger the switching mechanism into a toggled state. For verification of the completion of the switching process, a switch status signal 88 informs the voice and data switching protocol means of the completion of the physical toggling or routing of the information path through which data or voice may travel. As discussed above, prior art configurations of voice and data capable modems have incorporated the physical or hardware switching mechanisms onto the actual modem circuit board or device. By incorporating such additional functionality onto the modem board, the footprint or form factor of the modem device was required to either grow in size or become increasingly more congested thereby requiring that the modem circuit board be redesigned.

For portable applications, such as those characteristic of mobile or portable computing, miniaturized standards have been established specifying a standardized form factor for modems. One such standard, the PCMCIA standard, maintains a strict form factor and size configuration thereby making redesign and incorporation of additional functionality into an integrated form factor very difficult and expensive. Furthermore, integration of small form factor devices also lend themselves to additional portable functionality, such as the ability for a modem device to be interfaced through a separate connecting means to a wireless transceiver such as a cellular telephone.

The incorporation of such functionality through a separate port required the conglomeration of control, data and signal lines such as tip and ring into an integrated interface means. In such a configuration, a modem further includes a telephone interface means for providing a separate interface compatible with wireless transceivers or other peripheral devices. By way of example, and not limitation, in FIG. 3 the telephone interface means is depicted as telephone modem connector 64. In one preferred embodiment, telephone modem connector 64 comprises a 15 pin connector for providing the aforementioned signals. Referring to FIG. 3, the signals employed for carrying out one preferred embodiment of the present invention include tip signal 120, ring signal 118, switch control signal 84, and switch status signal 88.

As several types of devices, such as a wireless transceiver, may be interfaced to a modem through the telephone interface means, one preferred embodiment of the present invention further provides a cable identification means accessible by the modem for determining the precise nature of the peripheral or device interfaced via the telephone interface means. Such a cable identification means is comprised of a stored identification value readable by the modem for determining and properly configuring the telephone interface means for compatible interaction therewith. The modem means further comprises a data signal 112 and a clock signal 114 for clocking an receiving an informative cable identifier. By way of example, and not limitation, in FIG. 3 the cable identifier means is depicted as cable identifier 92. In one preferred embodiment, cable identifier 92 comprises a nonvolatile memory device, such as a read only memory (ROM) capable of being queried by the modem. While other techniques are contemplated such as a DIP switch configuration, other techniques are also known by those of skill in the art which are considered to be within the scope of the present invention.

The telecommunication system further comprises a voice and data hardware means providing the requisite switching and routing of voice and data information for interconnecting a voice telephone 20 and a data host 10 with a telephone network 14 for facilitating both voice and data communication over a single interconnection path during yet a single communication session. By way of example and not limitation, in FIG. 3 the hardware means is depicted as a cable assembly 66. Cable assembly 66 provides both a conduit through which information such as voice information may be pass to telephone 20 and provides a physical location in which to place the voice and data capable hardware for both facilitating the exchange of voice communications and impeding the exchange of data communications with a telephone 20.

To facilitate such routing of voice and data information, cable assembly 66 further includes a switching means for accommodating such routing. By way of example, and not limitation, in FIG. 3 the switching means is depicted as switch 94. In one preferred embodiment, switch 94 incorporates an optically coupled FET for enabling or facilitating the exchange of voice communications with telephone 20 and also for impeding or disabling the voice path between voice and data capable modem 60 and telephone 20. As discussed above, switch 94 is controlled by switch control signal 84 generated within the processor means of voice and data capable modem 60 and verified by switch status signal 88. Cable assembly 66 further includes, in one preferred embodiment, cable identifier 92, as described above.

Cable assembly 66 further includes a telephone connector means for interfacing directly with a telephone jack 21 of telephone 20. By way of example, and not limitation, in FIG. 3 the telephone connector means is depicted as telephone connector 70. In one preferred embodiment, telephone connector 70 comprises an RJ-11 telephone plug for compatible mating with telephone jack 21 thereby providing an interface through which a tip signal 102 and a ring signal 100 may compatibly traverse to telephone 20. In another preferred embodiment of the present invention, cable assembly 66 further includes a telephone cord 22 operatively coupled to telephone connector 70. By incorporating telephone cord 22 into cable assembly 66, telephone connector 70 may be located at a more protracted position relative to modem 60.

Cable assembly 66 may further include a connector housing 72 for providing a physical enclosure for the voice and data hardware such as switch 94 and cable identifier 92. Cable assembly 66 further includes a modem connector means for compatibly interfacing with the telephone interface means of modem 60. By way of example, and not limitation, in FIG. 3 the modem connector means is depicted as modem connector 68. In one preferred embodiment, modem connector 68 comprises a 15 pin connector compatible and complimentary to telephone modem connector 64. In a preferred embodiment, modem connector 68 and connector housing 72 form an integral component of cable assembly 66.

Figure 4:
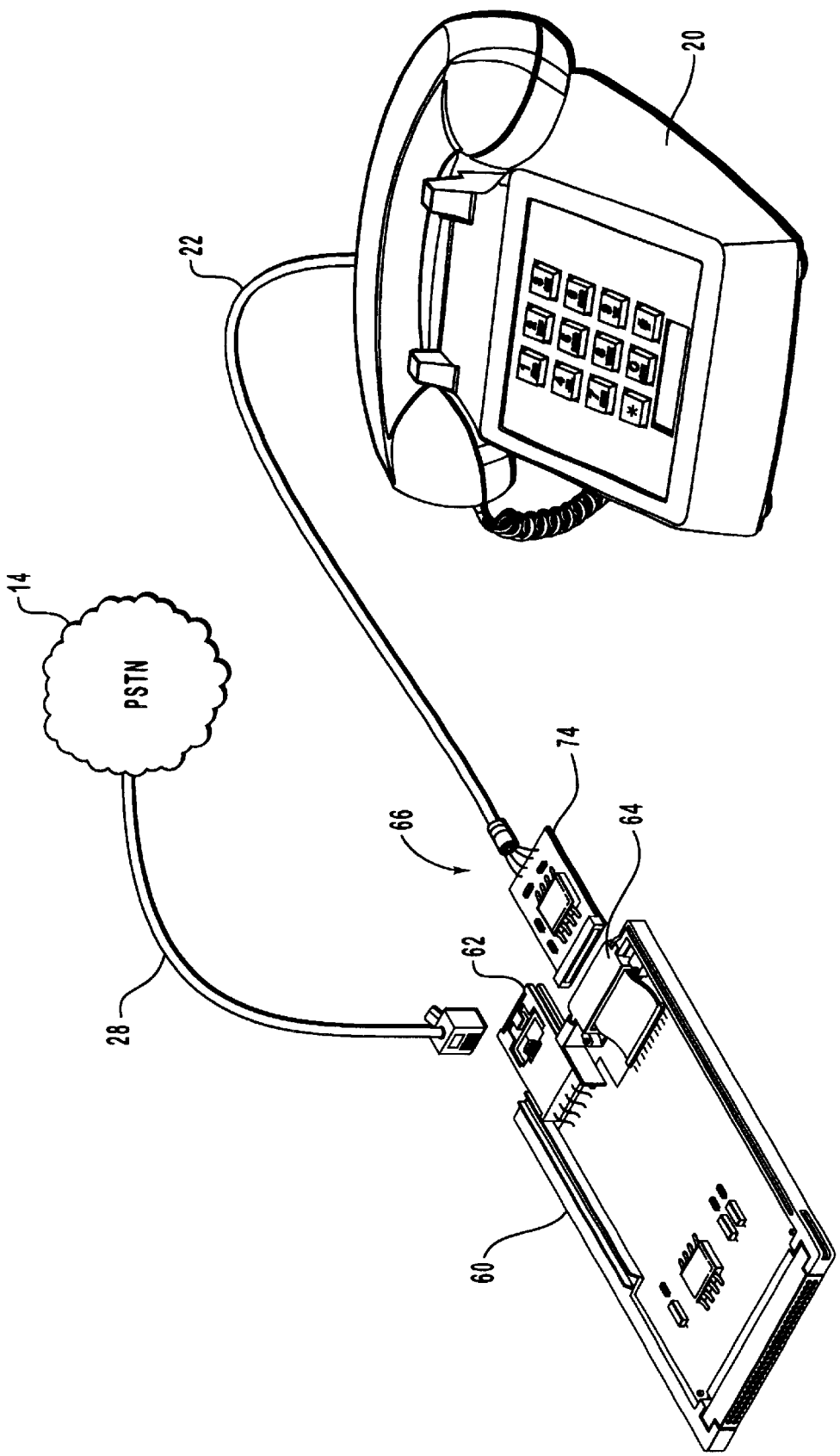
FIG. 4 is a diagram of a voice and data capable modem having a PCMCIA form factor for automatically switching between voice and data communications, in accordance with the preferred embodiment of the present invention.

FIG. 4 illustrates a preferred embodiment of the telecommunication system wherein the modem is implemented as a PCMCIA modem for use in more mobile computers such as notebook computers. Voice and data capable modem 60, as illustrated, takes the form of a PCMCIA card or module having telephone line modem jack 62 for interfacing with telephone network 14 via telephone line 28. Voice and data capable modem 60 further includes telephone modem connector 64 through which voice information may be exchanged with a voice user. Telephone modem connector 64, as described above, interfaces with cable assembly 66 through which voice information is routed or disabled as controlled by voice and data capable modem 60. Cable assembly 66 includes a printed circuit board 74 whereon switch 94 (FIG. 3) and alternatively cable identifier 92 (FIG. 3) in addition to other interconnection components may reside. Cable assembly 66 further includes, in one preferred embodiment, telephone cord 22 for facilitating a distant placement of telephone 20.

While the present embodiment illustrated in FIG. 4 comprises a PCMCIA voice and data capable modem, other architectures both integrated and remote are considered to be within the scope of the present invention. For example, as discussed above, the host system supporting voice and data capable modems may incorporate a significant amount of signal processing and other control functions within the host system. Such embodiments are also contemplated as being within the scope of the present invention.

Figure 5:
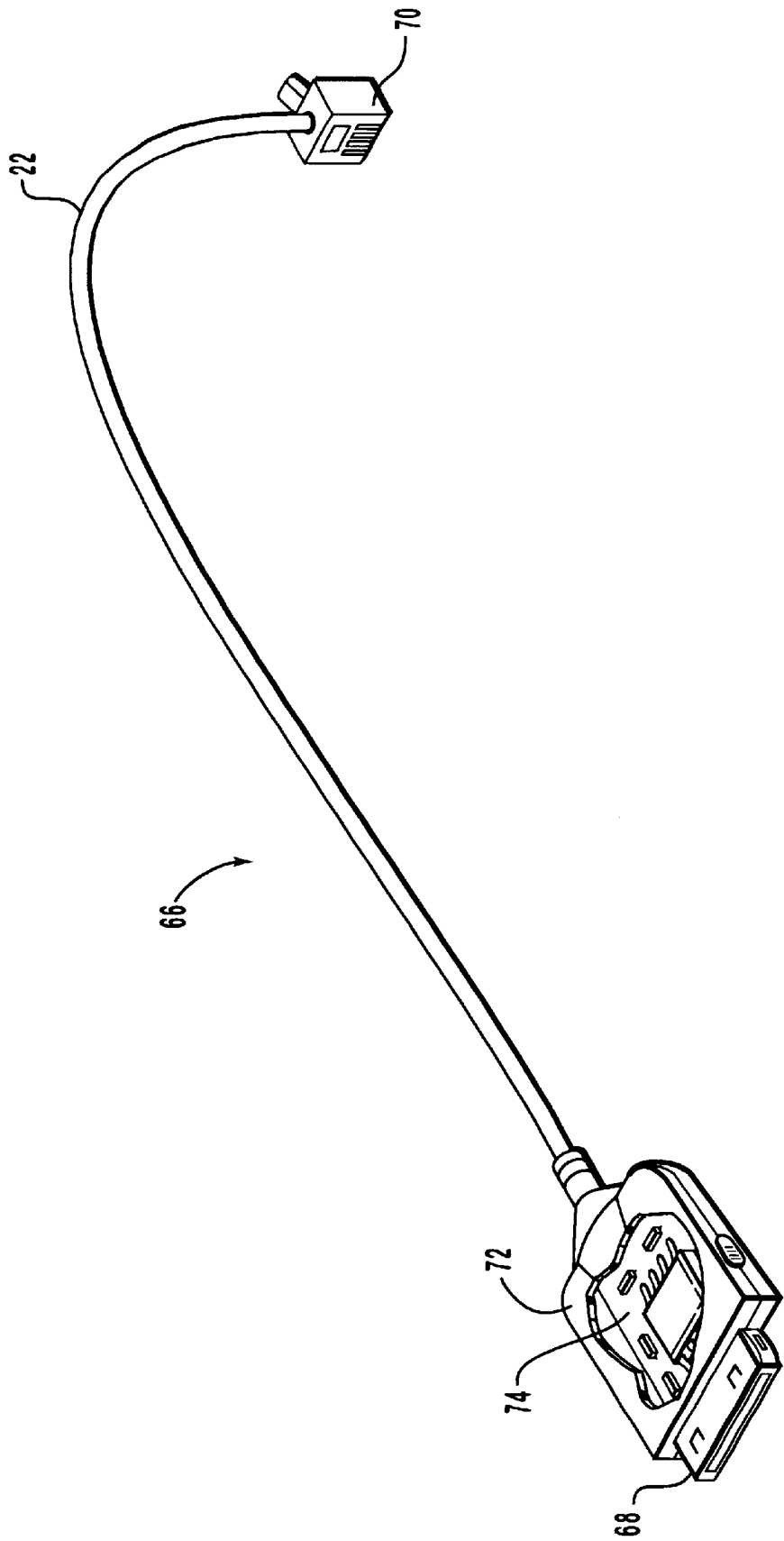
FIG. 5 is a diagram of a cable assembly for interconnecting a voice and data capable modem with a telephone, in accordance with the preferred embodiment of the present invention.

FIG. 5 illustrates in more detail cable assembly 66 and its components of the preferred embodiment. Cable assembly 66 interfaces with the voice and data capable modem 60 (FIG. 4) through modem connector 68. In the preferred embodiment, modem connector 68 takes the form of a 15 pin connector for compatibly mating with telephone modem connector 64 (FIG. 4). Telephone modem connector 64 (FIG. 4) may provide additional interfaces to other devices such as wireless or cellular transceivers. In the present invention, modem connector 68 operatively and electrically interfaces to printed circuit board 74 having, among other things, switching means and cable identification means as well as other circuit means described above for facilitating and inhibiting the transfer of voice information to a telephone.

Cable assembly 66 further comprises a connector housing 72 integrally connected with modem connector 68 for providing an encapsulating housing in which to secure printed circuit board 74. In one preferred embodiment of the present invention, cable assembly 66 further includes telephone cord 22 terminated by telephone cord 70 through which voice information may traverse to a more remotely or distantly located telephone.

Figure 6:
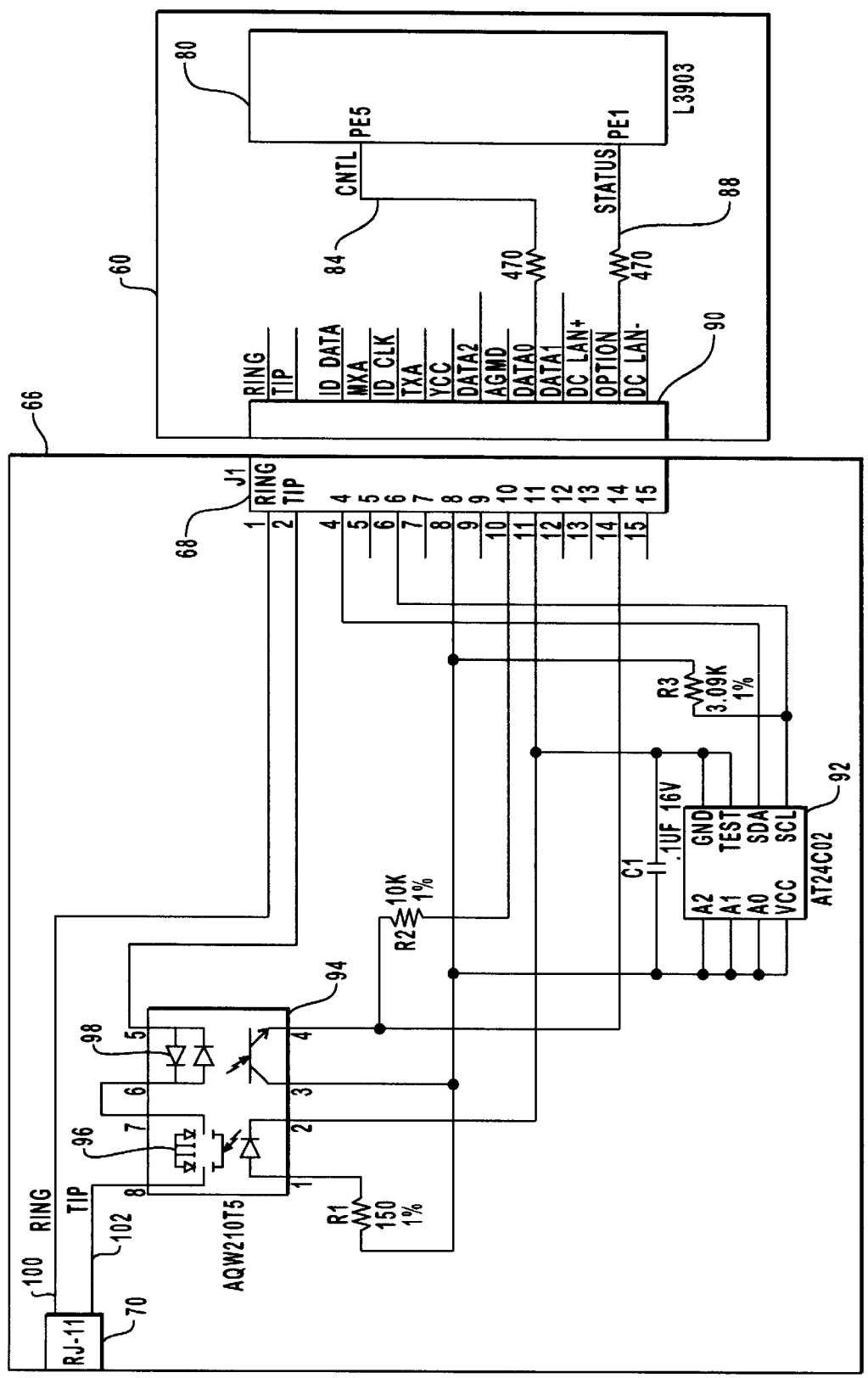
FIG. 6 is a schematic diagram of the cable assembly for providing switching between voice and data communications, in accordance the preferred embodiment of the present invention.

FIG. 6 is a schematic diagram of the cable assembly for providing switching between voice and data communication, in accordance with a preferred embodiment of the present invention. Those skilled in the art of modem design will recognize that a modem device may be developed by incorporating a particular manufacturer's chip set onto a printed wiring board.

For example, FIG. 6 illustrates a portion of voice and data capable modem 60 which may be comprised of a chip set, a portion of which is illustrated as a controller 80 providing a control and data interface. The preferred embodiment of the present invention employs a Rockwell chip set, however, other well-known manufacturer's chip sets may also be incorporated in the preferred embodiment of the present invention. It should be reiterated that voice and data capable modem chip sets are comprised of the firmware or software necessary for carrying out both voice and data communications.

For example, the preferred embodiment of the present invention employs the Voiceview voice and data protocol wherein the modem chip set is comprised of the functionality necessary for recognizing Voiceview commands such as start tones and other control signals utilized in switching between voice and data capability. Upon the recognition of control information such as start tones, a portion of the modem chip set, such as controller 80, recognizes the control information and accordingly responds with control signals necessary for facilitating the switching between voice and data modes.

For example, a relay control signal 84 is activated by controller 80 upon the detection or initiation of a data mode associated with a successfully negotiated transition between voice and data mode which passes from a connector 90 located on modem 60 to cable assembly 66 via connector 68. The relay control signal then passes to switch 94 for facilitating or inhibiting communication to the telephone via telephone connector 70. Switch 94 is illustrated as a normally closed relay providing a path for the voice information to travel to telephone 20. As a verification for the switching of switch 94, a status signal 88 monitors the switching of switch 94 and reports such status to controller 80 for verification.

In the preferred embodiment, switch 94 takes the form of an optical relay wherein the activation of relay control signal 84 activates a light emitting diode (LED) which optically couples to a receptor 96 thereby providing the physical switching path for voice information. When receptor 96 is activated, an LED 98 optically couples to a status receptor which denotes the completion of the switching by the activation or deactivation of status signal 88.

FIG. 6 also illustrates a means for cable identification which is illustrated as cable identifier 92. In the preferred embodiment, cable identifier 92 comprises a non-volatile ROM whose identifier is retrieved by employing a serial clock for extraction of serial data. For simplicity, the interconnection of cable identifier 92 with controller 80 is not illustrated, however, such an implementation utilizes a control signal from controller 84 implementing the serial clock and an input signal at controller 80 for receiving the serial data uniquely identifying the cable assembly 66.

The present invention may be embodied in other specific forms without departing from the spirit or essential characteristics. The described embodiments are to be considered in all respects only illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A cable assembly for automatically switching between voice and data communications as directed by a voice and data capable modem having a telephone line interface for connecting with a telephone network and a telephone interface for ultimately connecting with a telephone thereby providing voice capability, said cable assembly comprising:
   a) a modem connector having a plurality of electrical leads for operatively and detachably connecting with said telephone interface;
   b) a switch operatively and electrically connected to at least one of said plurality of electrical leads of said modem connector to select between routing said voice communications to said telephone as directed by said voice and data capable modem external to said cable assembly; and
   c) a telephone connector having at least two electrical leads operatively and electrically connected to said plurality of electrical leads of said modem connector wherein at least one of said at least two of said plurality of electrical leads is coupled to said at least two electrical leads of said telephone connector via said switch.

2. The cable assembly as recited in claim 1, further comprising a cable identifier operatively and electrically connected to at least one of said plurality of electrical leads to facilitate identification of said cable assembly, from among other types of cable assemblies, by said voice and data capable modem as including said switch.

3. The cable assembly as recited in claim 1, wherein voice and data capable modem is a cellular-capable modem and said telephone interface means is a cellular telephone interface.

4. The cable assembly as recited in claim 1, further comprising a connector housing to consolidate said modem connector, said switch and said telephone connector at least partially therein.

5. The cable assembly as recited in claim 4, wherein said telephone connector couples to said connector housing via a telephone cord to permit said telephone to be located at a distance from said connector housing.

6. The cable assembly as recited in claim 4, further comprising a printed circuit board incorporated within said connector housing for interconnecting said modem connector, said switch and said telephone connector.

7. In a telecommunication network for interfacing at least a local user with a remote user via a telephone network, a telecommunication apparatus for interfacing to a host system of said local user to automatically switch between voice and data communications, said apparatus comprising:
   a) a voice and data capable modem including:
      i) a telephone line interface for connecting with said telephone network;
      ii) a telephone interface for ultimately connecting with a local user telephone;
      iii) a processor operatively and electrically coupled between said host system, said telephone line and telephone interface, said processor further including a voice and data switching protocol to process and initiate switching between said voice and data communications; and
   b) a cable assembly including:
      i) a modem connector having a plurality of electrical leads for operatively and detachably connecting with said telephone interface;
      ii) a switch operatively and electrically connected to at least one of said plurality of electrical leads of said modem connector to select between routing said voice communications to said telephone as directed by said voice and data capable modem; and iii) a telephone connector having at least two electrical leads operatively and electrically connected to said plurality of electrical leads of said modem connector wherein at least one of said at least two of said plurality of electrical leads is coupled to said at least two electrical leads of said telephone connector via said switch.

8. The telecommunication apparatus as recited in claim 7, wherein said cable assembly further comprises a cable identifier operatively and electrically connected to said telephone interface, said cable identifier to facilitate identification of said cable assembly, from among other types of cable assemblies, by said voice and data capable modem as including said switch.

9. The telecommunication apparatus as recited in claim 7, wherein said voice and data capable modem is a cellular-capable modem and said telephone interface is a cellular telephone interface.

10. The telecommunication apparatus as recited in claim 7, wherein said processor is physically implemented separate from said host system.

11. The telecommunication apparatus as recited in claim 7, wherein at least a portion of said processor of said voice and data capable modem is physically implemented as host system-executable components within said host system.

12. The telecommunication apparatus as recited in claim 7, wherein said cable assembly further comprises a connector housing to consolidate said modem connector, said switch and said telephone connector at least partially therein.

13. The telecommunication apparatus as recited in claim 12, further comprising a printed circuit board incorporated within said connector housing for interconnecting said modem connector, said switch and said telephone connector.

14. In a telecommunication network supporting both voice and data communications, a method for routing said voice and data communications between a voice and data capable modem and a telephone interfaced via a cable assembly, said method comprising the steps of:

a) at a switch within said cable assembly, impeding the exchange of data communications with a telephone connector for interfacing with said telephone when directed by said voice and data capable modem; and b) when directed by said voice and data capable modem, said switch facilitating the exchange of voice communications with said telephone connector.

15. The method as recited in claim 14, further comprising the step of said cable assembly divulging a cable assembly identifier to facilitate identification of said cable assembly, from among other types of cable assemblies, by said voice and data capable modem as including said switch.

16. The method as recited in claim 14, wherein said facilitating the exchange of voice communications with said telephone connector further comprises the step of exchanging said voice communications with said telephone via a telephone cord extending between said switch and said telephone.

17. A cable assembly for automatically switching between voice and data communications as directed by a voice and data capable modem having a telephone line interface for connecting with a telephone network and a telephone interface for ultimately connecting with a telephone thereby providing voice capability, said cable assembly comprising:

a) a modem connector having a plurality of electrical leads for operatively and detachably connecting with said telephone interface;

b) a switch operatively and electrically connected to at least one of said plurality of electrical leads of said modem connector to select between routing said voice communications to said telephone as directed by said voice and data capable modem; and c) a telephone connector having at least two electrical leads operatively and electrically connected to said plurality of electrical leads of said modem connector wherein at least one of said at least two of said plurality of electrical leads is coupled to said at least two electrical leads of said telephone connector via said switch.

* * * * *